UNITED STATES PATENT OFFICE.

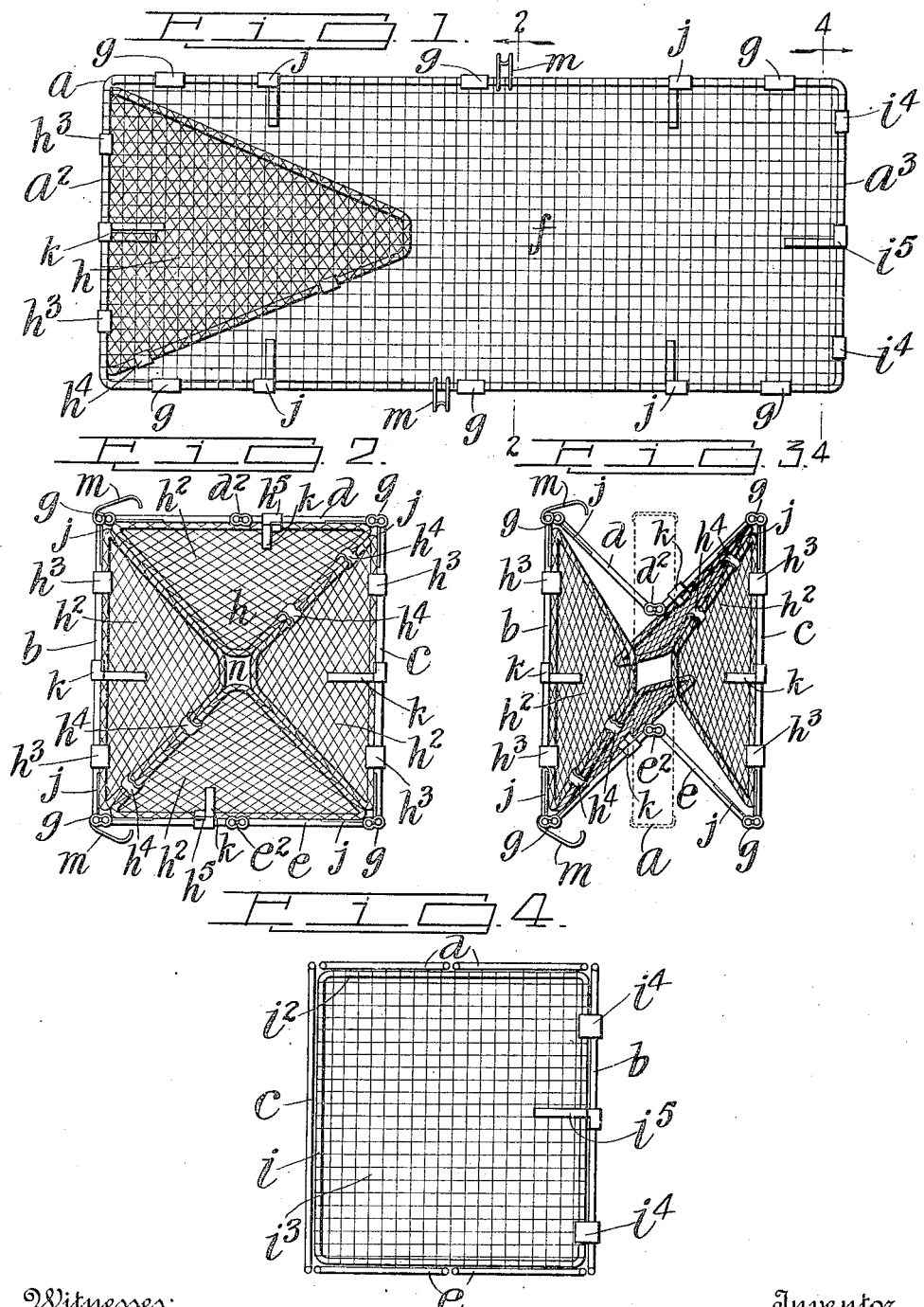

JOHN UMSTÄTTER, OF NEW YORK, N. Y.

FISH-TRAP.

1,134,428.  Specification of Letters Patent.  Patented Apr. 6, 1915.

Application filed September 21, 1914. Serial No. 862,674.

*To all whom it may concern:*

Be it known that I, JOHN UMSTÄTTER, a citizen of the United States, and residing at New York, in the county of New York and State of New York, have invented certain new and useful Improvements in Fish-Traps, of which the following is a specification, such as will enable those skilled in the art to which it appertains to make and use the same.

This invention relates to fish traps, and the object thereof is to provide an improved device of this class which is particularly designed for use in catching small fish, eels and the like, but which may be made of any desired size and used for any of the purposes for which traps of this class are usually intended; a further object being to provide a trap of the class specified which may be compactly folded together when not in use.

The invention is fully disclosed in the following specification, of which the accompanying drawing forms a part, in which the separate parts of my improvement are designated by suitable reference characters in each of the views, and in which:—

Figure 1 is a side view of my improved trap; Fig. 2 a transverse section on the line 2—2 of Fig. 1; Fig. 3 a view similar to Fig. 2 and showing the trap partially folded together in full lines and indicating the same completely folded together in dotted lines; and, Fig. 4 a section on the line 4—4 of Fig. 1.

My improved trap is oblong and rectangular in form and comprises an oblong body portion $a$ composed of similar opposite side portion $a$ composed of similar opposite side members $b$ and $c$, and similar top and bottom members $d$ and $e$. The side members $b$ and $c$ and top and bottom members $d$ and $e$ consist of oblong rectangular frames made of heavy strong wire and having wire mesh body portions $f$.

The top and bottom members or frames $d$ and $e$ are divided centrally and longitudinally into separate similar parts which are hinged together at $d^2$ and $e^2$, and the side members $b$ and $c$ and the top and bottom members $d$ and $e$ are hinged together as shown at $g$.

For the purpose of this description, the end $a^2$ will be called the front end, and the end $a^3$ the rear end of the trap, and the front end of the trap is provided with a conical, inwardly directed inlet device $h$ composed of four separate similar triangular parts $h^2$ consisting of triangular frames and wire mesh body portions, and two of the parts $h^2$ are hinged to the front ends of the side frame members $b$ and $c$, as shown at $h^3$, and the other two, or the top and bottom $h^3$, and the other two, or the top and bottom parts $h^2$, are hinged to the side parts $h^2$ which are hinged to the side frame members, and as shown at $h^4$, and the top and bottom parts $h^2$ are also hinged to the front ends of the top and bottom frame members $d$ and $e$, or the side portions thereof adjacent to the hinges $h^4$ as shown at $h^5$, and in folding the trap together, as shown and indicated in Fig. 3, the top and bottom parts $h^2$ of the conical inlet device $h$ at the front end of the body of the trap fold onto the opposite side members $h^2$ of said inlet device to which they are hinged.

The rear end $a^4$ of the trap is provided with a door $i$ comprising a rectangular frame member $i^2$ and body $i^3$ of wire mesh, and this door is hinged to the side frame member $b$ of the trap, or the rear end portion thereof, as shown at $i^4$, and a spring $i^5$ is secured to said frame member $b$ and normally serves to hold the door $i$ in a closed position, but this door may be folded inwardly in the operation of folding the parts of the trap together.

I also provide springs $j$ which are secured to the side frame members $b$ and $c$ and top and bottom frame members $d$ and $e$ as indicated in Figs. 1 and 2, and which normally serve to hold the separate parts of the trap in the expanded position, as shown in Figs. 1 and 2, and other springs $k$ are connected with the front end portions of the frame members $b$ and $c$, $d$ and $e$ and bear on the triangular inlet frame members $h$ and normally serve to hold the same in operative position, as shown in said figures.

In Fig. 3 of the accompanying drawing, I have shown in full lines the first step in folding the separate parts of the trap together, and have indicated in dotted lines the complete folding thereof, and from this figure it will be seen that the trap may be folded when not in use into a compact body which may be conveniently carried or packed for any purpose.

I also connect with the top of one of the side frame members $b$—$c$ spring hook devices $m$ and when the side members $b$ and $c$ have been compactly folded together, as indicated in dotted lines in Fig. 3, these hook devices m may be used for securing the side frame members b—c together as indicated in dotted lines in Fig. 3.

The inner end portions of the trap members $h^2$ are cut off, or the entire inlet device $h$ is made truncated in form to provide an opening $n$ through which the fish, eels and the like pass into the trap, and this opening may be made of any desired size.

My invention is not limited to the material herein specified, nor to the division centrally and longitudinally of what is herein called the top and bottom frame members $d$ and $e$, as these terms are only used relatively, and the top and bottom frame members may be made integral or continuous, and the opposite side frame members $b$ and $c$ may be divided centrally and longitudinally, if desired, and other changes in and modifications of the construction herein described may be made, within the scope of the appended claims, without departing from the spirit of my invention or sacrificing its advantages.

Having fully described my invention, what I claim as new and desire to secure by Letters Patent, is:—

1. A collapsible trap of the class described, comprising an oblong body portion composed of four oblong, rectangular, openwork, side frames hinged together; said trap both when set for use and when collapsed being rectangular in form in both longitudinal and cross section, said body portion being also provided at one end with a hinged and spring controlled door which is adapted to fold inwardly and at the opposite end with an inwardly directed, tapered or truncated device composed of four similar triangular parts two of which are hinged together and two of which are hinged to the front end portions of two of the side frame members, said side frame members being also provided with spring devices which normally serve to hold the parts of the trap in an expanded position for use, the triangular inlet frame members being also provided with springs for a similar purpose, and two opposite side frame members of the body portion being composed of separate parts hinged together centrally and longitudinally thereof.

2. A collapsible trap of the class described, comprising an oblong, body portion composed of four oblong, rectangular, openwork, side frame members hinged together; said body portion being rectangular both in longitudinal and cross section when set for use, and being also rectangular in longitudinal and cross section when collapsed, and said body portion being provided at one end with a hinged and spring controlled door and at the opposite end with an inwardly directed tapered or truncated inlet device composed of four similar triangular parts two of which are hinged together and two of which are hinged to the front end portions of two of the side frame members, two opposite side frame members of the body portion being also composed of separate parts hinged together centrally and longitudinally thereof and said body portion being adapted to be collapsed by pressure applied to the other opposite side frame members thereof in which operation the side frame members which are composed of separate parts fold inwardly.

3. A collapsible trap of the class described, comprising an oblong body portion composed of four, oblong, rectangular, openwork, side frames hinged together; said body portion being rectangular in form both in longitudinal and cross section when expanded for use and also when collapsed, and said body portion being provided at one end with a door which opens inwardly and at the opposite end with an inwardly directed, tapered or truncated inlet composed of four similar triangular parts adapted to be folded together, two opposite side frame members being composed of separate parts hinged together centrally and longitudinally thereof and said body portion being collapsed by pressing the other opposite side frame members thereof inwardly in which operation the side frame members composed of separate parts fold inwardly.

4. A collapsible trap of the class described, comprising an oblong, rectangular body portion, composed of four oblong, rectangular, openwork, side frames hinged together; said body portion being oblong and rectangular in form when expanded for use and also when collapsed, and said body portion being also provided at one end thereof with a hinged door and at the opposite end with an inwardly directed, tapered or truncated inlet device composed of four similar triangular parts, part of which are hinged together and part to the front end portion of said side frame members, two opposite side frame members being composed of separate parts hinged together centrally and longitudinally and said body portion being adapted to be collapsed by pressure applied to other opposite side frame members.

In testimony that I claim the foregoing as my invention I have signed my name in presence of the subscribing witnesses this 19th day of September, 1914.

JOHN UMSTÄTTER.

Witnesses:
C. MULREANY,
H. E. THOMPSON.